Patented May 27, 1947

2,421,079

UNITED STATES PATENT OFFICE 2,421,079

METHOD FOR SILVERING NONCONDUCTIVE MATERIALS

Harold Narcus, Worcester, Mass.

No Drawing. Application January 31, 1946,
Serial No. 644,661

1 Claim. (Cl. 117—47)

This invention relates to processes for metalizing non-conductive materials such as glass, ceramics, wood, leather, hard rubber, synthetic and natural resins, such as the phenol condensation products, urea resins, cellulosic plastic materials or materials coated therewith; and the principal object of the invention is to provide a convenient, dependable and inexpensive process for the above purpose.

Another object of the invention is to provide a process for treating the above named non-conductive materials so that an adherent metal coating may be applied thereto.

Another object is to provide a novel and improved process for applying to the surfaces of the above materials a conductive layer capable of receiving subsequent electrodeposition.

Various other objects and advantages will be apparent as the nature of the invention is more fully disclosed.

The present process comprises in general treating the surface of a material, not capable of being metal coated in the usual electroplating manner, with an adherent metallized layer, said layer being suitable for subsequent electroplating.

Available processes for performing the metalization of non-conductive materials have produced non-uniform and poorly adherent metalized layers. The result is a poorly adherent metallic coating especially in the case of electrodeposited thicknesses of relatively large magnitude, as .001" or over.

It has been found that materials which are non-conductive or of high electrical resistance such as the synthetic plastics, must be pretreated so that they will be receptive to an adherent metalized layer.

This pretreatment produces a nuclei of reductive ions in the pores of the properly roughened plastic so that the formation of the metalized coating is not only accelerated but its adhesion to the plastic is greatly improved.

Specifically, the non-conductive substance is first roughened by any usual means such as rolling in sand, pumice and water, or blasting with aluminum oxide (220 grain). It is then cleaned thoroughly using mild proprietary cleaners which will not severely attack the substance. After thorough rinsing it is then treated in a "sensitizing" solution to prepare the surface for the subsequent conductive layer prior to electrodeposition.

The term "sensitizing" applies to the treatment which produces a nuclei of reductive ions in the pores of the substance accelerating the formation of the metal coating and its subsequent good adhesion to the inert substance.

As an example of one method for carrying out this process, the material, such as cellulose acetate or any other synthetic resin of the thermoplastic or thermo-setting type, may first be roughed slightly, best by mechanical means. It is then cleansed in a mild alkaline cleaner to remove all foreign substance and thoroughly rinsed. The material thus roughened and cleansed is placed in the so-termed "sensitizing" solution for ½ to 1 minute.

This solution may have the following composition:

Stannous fluoborate ($SnBF_4$)$_2$ grams__ 15–20
Fluoboric acid (42%) sol. ($HBF_4$) ___c. c__ 250
Water _____ c. c__ 1000

After the surface has been thoroughly "sensitized" as described above, the sensitizer solution is thoroughly rinsed away and the surface subjected to an ammoniacal silver solution reduced in a well-known manner. The latter solution may be any commonly used in the mirror making industry such as ammoniacal silver nitrate reduced with formaldehyde or Rochelle salts or cane sugar reagent (Brashear formula).

By employing this process only one silver treatment is necessary, due to the greater affinity of the silvering solution for the article treated as described.

After the silver coating has dried thoroughly the material is subjected to the action of a plating bath with the cathode connection attached to the now conductive object.

It has been found that the addition of 75–100 grams of sodium chloride to the sensitizing solution somewhat assists in the production of the nuclei of reductive ions on the inert object to be metalized, and therefore this invention contemplates the sensitizer with and without the sodium chloride, the sodium chloride being in reality an accelerator in the action.

Having thus described my invention and the advantages thereof, I do not wish to be limited to the details herein disclosed, otherwise than as set forth in the claim, but what I claim is:

A method of metal coating the surface of a non-conductive material which comprises roughening said surface, cleaning the surface to remove foreign substances, immersing same in the following solution for a period of ½-1 minute:

| | | |
|---|---|---|
| Stannous fluoborate | grams | 15-20 |
| Fluoboric acid (42%) | c. c. | 250 |
| Sodium chloride | grams | 75-100 |
| Water | c. c. | 1000 | to cause the surface to be receptive to the formation of a subsequent conductive layer, thoroughly washing the same to remove excess of the solution and then treating the properly washed material in any of the usually employed silvering solutions.

HAROLD NARCUS.

REFERENCES CITED

The following references are of record in the file of this patent:

UNITED STATES PATENTS

| Number | Name | Date |
|---|---|---|
| 2,030,476 | Smith | Feb. 11, 1936 |
| 2,278,722 | Loiseleur | Apr. 7, 1942 |
| 2,303,871 | Walker | Dec. 1, 1942 |
| 2,355,933 | Weiss | Aug. 15, 1944 |